United States Patent [19]
Oudet et al.

[11] Patent Number: 5,789,917
[45] Date of Patent: Aug. 4, 1998

[54] MAGNETIC POSITION SENSOR WITH HALL PROBE FORMED IN AN AIR GAP OF A STATOR

[75] Inventors: Claude Oudet, Besancon; Daniel Prudham, Thise, both of France

[73] Assignee: Moving Magnet Technologie SA, Besancon, France

[21] Appl. No.: 382,198

[22] Filed: Feb. 1, 1995

Related U.S. Application Data

[63] Continuation-in-part of Ser. No. 917,061, filed as PCT/FR91/00973 Dec. 5, 1991, Pat. No. 5,528,139.

[30] Foreign Application Priority Data

Dec. 5, 1990 [FR] France .................................. 90/15223
Feb. 1, 1994 [FR] France .................................. 94/01073

[51] Int. Cl.⁶ .......................... G01B 7/14; G01B 7/30; G01R 33/06; H01L 43/06
[52] U.S. Cl. ............................. 324/207.2; 324/207.25
[58] Field of Search .......................... 324/207.2, 207.21, 324/207.25, 237, 251, 252; 330/32 R, 32 H

[56] References Cited

U.S. PATENT DOCUMENTS

| | | |
|---|---|---|
| 3,184,620 | 5/1965 | Liebowitz et al. ............ 324/207.2 |
| 3,365,594 | 1/1968 | Davidson, Jr. ................... 324/251 |

*Primary Examiner*—Walter E. Snow
*Attorney, Agent, or Firm*—Oblon, Spivak, McClelland, Maier & Neustadt, P.C.

[57] ABSTRACT

A magnetic position sensor having a thin tubular-shaped permanent magnet that is integral with a coupling shaft. The permanent magnet is mobile in rotation in a main air gap between two parts made of a soft magnetic material. One of the parts is formed by a stator having a secondary air gap in which a Hall probe is housed. The stator is placed coaxially on the inside of the tubular-shaped permanent magnet, with the other magnetic part including a coaxial tubular yoke with the tubular-shaped permanent magnet and defining, with the stator, a cylindrical main air gap.

16 Claims, 3 Drawing Sheets

MAGNETIC POSITION SENSOR WITH HALL PROBE FORMED IN AN AIR GAP OF A STATOR

CROSS-REFERENCE TO RELATED APPLICATION

The present application is a Continuation-In-Part of co-pending U.S. application Ser. No. 07/917,061, filed as PCT/FR91/00973 Dec. 5, 1991, now U.S. Pat. No. 5,528,139.

BACKGROUND OF THE INVENTION

1. Field of the Invention

This invention relates to a magnetic position sensor which includes a thin tubular-shaped permanent magnet that is integral with a coupling shaft. The permanent magnet is mobile in rotation in a main air gap between two parts made of a soft magnetic material. One of the parts is formed by a stator having a secondary air gap in which a Hall probe is housed.

2. Discussion of the Background

A magnetic position sensor is described in the applicant's French application FR 9105223. This type of sensor offers a major advantage compared with Hall probe sensors of the prior art that are disclosed, for example, by the U.S. Pat. No. 3,194,990 or the patent DE 2923644 because it makes it possible to obtain an output signal that is almost proportional to an angular position, with a linearity error that is easily less than 0.2%, whereas the sensors of the prior art require electronic circuits for linearization of the signal, whereby their response is generally of the sinusoidal type.

It has turned out, however, that in certain applications requiring extensive miniaturization or applications intended for operation in magnetically perturbed environments, the Hall probe detects spurious magnetic fields which disrupt the measurement of angular position.

SUMMARY OF THE INVENTION

Accordingly, one object of this invention is to provide a novel sensor which eliminates drawbacks in other sensors by proposing an embodiment that considerably reduces the impact of spurious magnetic fields on the quality of the output signal.

Another object of the invention is to provide a novel sensor in an embodiment that makes it possible to reduce the number of mechanical parts and to reduce the dimensions of the sensor without affecting its strength.

These results are obtained by the invention in connection with a sensor whose stator is placed coaxially inside a tubular magnet, whereby a second magnetic part includes a coaxial tubular yoke with the tubular magnet defining, with the stator, a cylindrical main air gap.

The outside yoke performs a dual function:

(1) on the one hand, the yoke closes the magnetic flux that is produced by the permanent magnet and that exits by the poles located on its outside surface, (2) and on the other hand, the yoke forms a screen against spurious magnetic fields.

This embodiment of the invention therefore makes it possible to significantly harden, without additional parts and at no extra costs, the sensor against outside magnetic perturbations.

Advantageously, the permanent magnet is integral with the second magnetic part, with the second magnetic part being integral with the coupling shaft. The yoke, in this case, is mobile and slightly increases the inertia of the sensor. It nevertheless has an additional function, which includes mechanically reinforcing the permanent magnet, which is generally made of a relatively fragile material.

According to a preferred embodiment, the second magnetic part has a first tubular part whose inside surface is in contact with the entire outside surface of the permanent magnet and which is connected to a transverse flange for connecting to the coupling shaft. Preferably, the flange is located far enough from the magnet and the stator so as not to influence the field distribution and/or the flange is made of a nonmagnetic material. This distance, for example, is on the order of 2 millimeters for a magnet with a diameter of 22 millimeters.

The second magnetic part thus completely surrounds the permanent magnet and the stator.

Advantageously, the permanent magnet fits snugly to second magnetic part.

According to a preferred variant, the stator is molded in a stationary case that has an axial bore forming a bearing for the coupling shaft. Preferably, the stator includes two parts which are made of a soft magnetic material in the shape of a semi-tubular cylinder and which are positioned in the stationary case during molding with the aid of, for example, two positioning cavities.

This variant makes it possible to avoid resorting to a bearing and therefore makes it possible to reduce the cost of the components and to simplify the assembly process.

Advantageously, the molding case of the stator has a groove for positioning the permanent magnet and the outer yoke made of a soft magnetic material and is extended by a coaxial outside annular part, with an inside diameter that is at least equal to the outside diameter of the yoke, with the tubular part being extended by at least one fastening lug.

According to a specific variant, the case has a cavity for housing a Hall probe in the secondary air gap, with the case having at its rear front part a housing for an electronic circuit for processing signals generated by the Hall probe.

Preferably, the length of the magnet is less than the length of the stator by a value between E and 2E, where E designates the width of the air gap, to reduce the influence of axial play.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
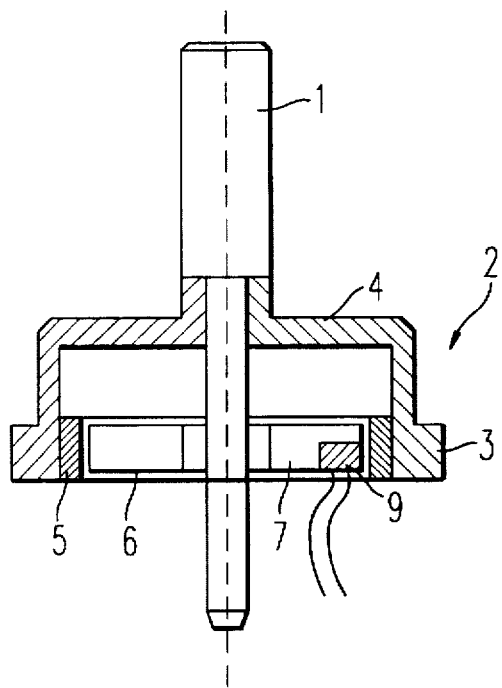
FIG. 1 depicts a view in median section of a first example of an embodiment of a sensor according to the invention.

Referring now to the drawings, wherein like reference numerals designate identical or corresponding parts throughout the several views, and more particularly to FIG. 1 thereof, there is shown a view in median section of a first embodiment of the invention.

The sensor described by way of a nonlimiting example with reference to FIG. 1 is coupled to a drive shaft 1, the angular position of which is to be measured. A yoke 2 is integral with this shaft 1. The yoke 2 is made of a soft magnetic material, for example soft iron. The yoke 2 has a tubular part 3 and a front flange 4 for connecting to the coupling shaft 1. On the inside of tubular part 3 of yoke 2, a permanent magnet 5 is snugly attached. This magnet 5 includes a radially magnetized tubular element. The magnet 5 has a roof tile-shaped first part that is magnetized in one direction, for example having a NORTH pole facing outward and a SOUTH pole facing inward, and a second part that is opposite in relation to the median plane having its SOUTH pole facing outward and its NORTH pole facing inward.

Yoke 2 and magnet 5 are mobile in rotation in relation to a stationary stator 6, 7 which is housed on the inside of tubular magnet 5. In the first embodiment described, stator 6, 7 is tubular in shape and has a central hole 7 for the passage of the end of shaft 1. Stator 6, 7 includes a packet of iron-nickel or iron-silicon stacked sheets.

Figure 2:
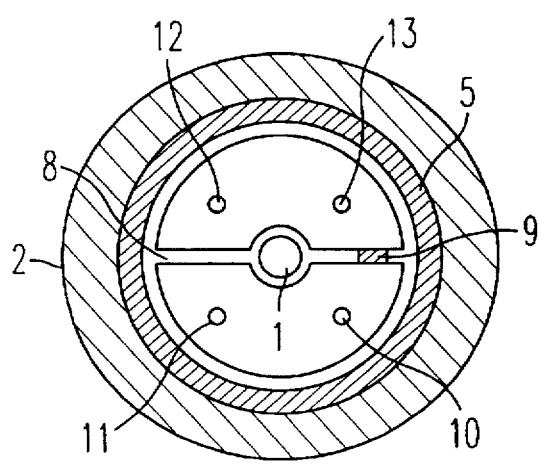
FIG. 2 shows a view in cross-section of the sensor of FIG. 1.

Stator 6, 7 has a secondary air gap 8 that extends in a radial plane, as indicated in FIG. 2. A Hall probe 9 is housed in this secondary air gap 8. Stator 6, 7 includes two parts which are positioned by pins that are inserted in holes 10 to 13 and in a stationary reference plate, or by molding. During molding, pins are introduced into these bores to hold the two components in place.

Figure 3:
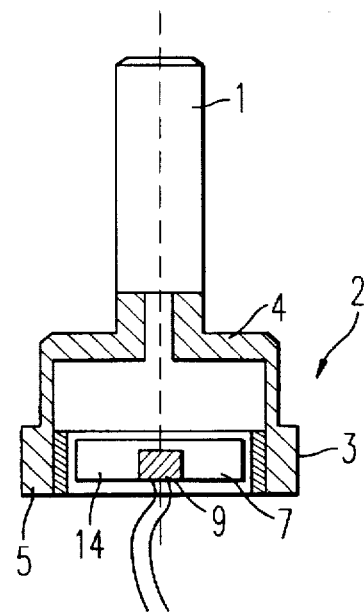
FIGS. 3 and 4 show views in median and cross-section, respectively, of a second example of an embodiment of a sensor according to the invention.
Figure 4:
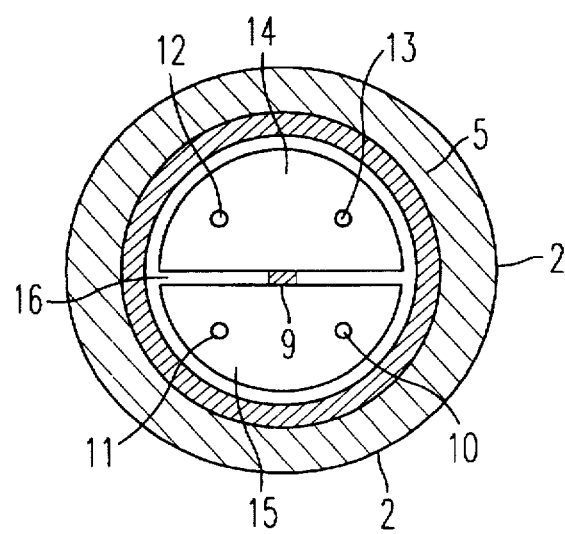

FIGS. 3 and 4 present a second embodiment of the invention, which is distinguished from the first embodiment by the shape of the stator. In this second embodiment of FIGS. 3 and 4, stator 6, 7 includes two half-cylinders 14, 15 which between them define a secondary air gap 16 whose faces are symmetrical in relation to median plane 17 that passes through central shaft 1. In this embodiment of FIGS. 3 and 4, shaft 1 does not pass through the sensor, but instead shaft 1 is guided by a bearing that is an integral part of the device whose angular position is to be determined.

Figure 5:
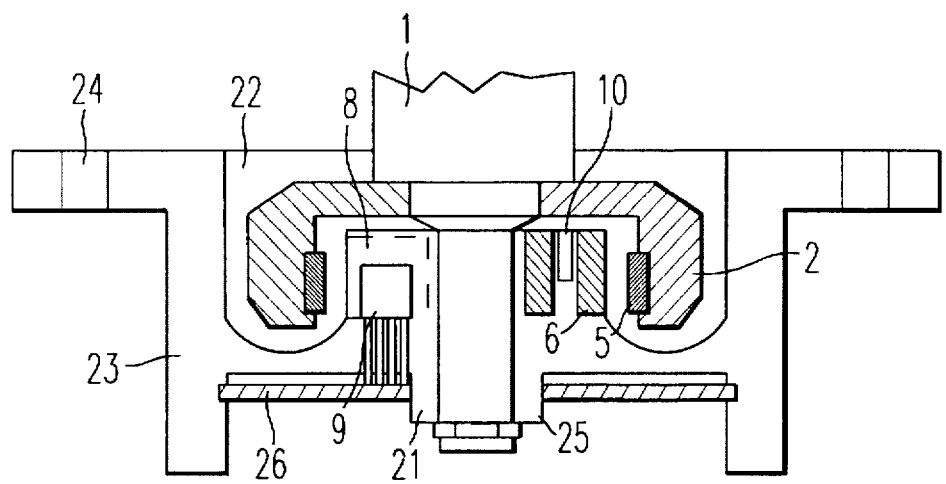
FIG. 5 presents a view in median section of a third example of an embodiment of a sensor according to the invention.

FIG. 5 presents a third variant embodiment of the invention, corresponding to the stator shape described in connection with the first embodiment of FIGS. 1 and 2.

In the embodiment of FIG. 5, molding case 20 of stator 6, 7 has an inside central tubular part 21 in which the stator is housed, a groove 22 inside of which yoke 2 and magnet 5 move, and a second tubular part 23 extended by fastening lugs 24. Central tubular part 21 is pierced by a bore 25 forming a bearing for coupling shaft 1. The rear front part of the case has a cylindrical housing for a printed circuit 26 that supports the secondary air gap 8, and the Hall probe 9 which is housed therein is traversed by a field whose amplitude is directly a function of the relative position of magnetic transitions 30, 31 in relation to that of secondary air gap 8 (see also FIG. 6). When the plane that passes through magnetic transitions 30, 31 of the magnet 5 is merged with the plane passing through secondary air gap 8, the flux passing through the Hall probe 9 is at a maximum. However, when the two planes are perpendicular, the flux passing through the Hall probe 9 is zero.

Figure 7:
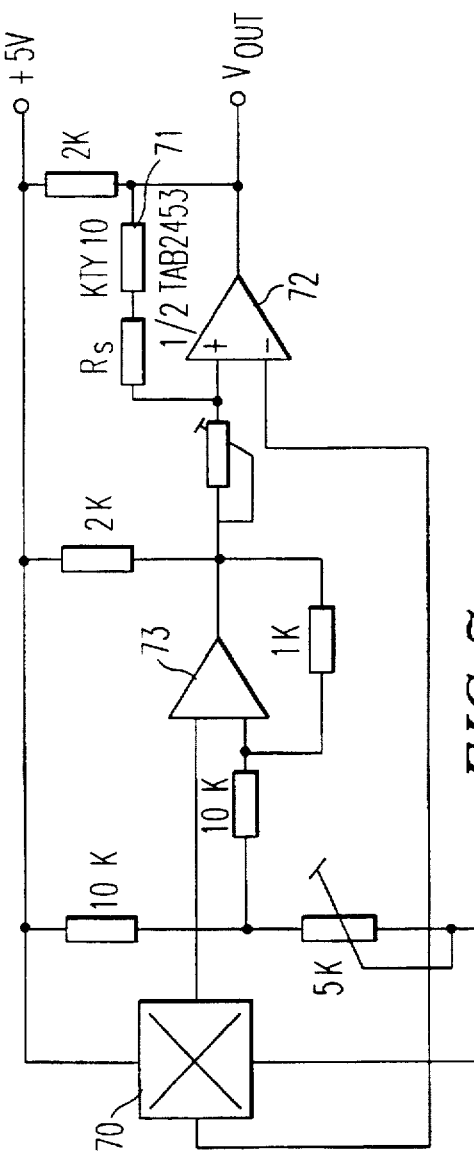
FIG. 7 presents a schematic diagram of an example of embodiment of an electronic circuit for processing the signal output by the sensor according to the present invention.

FIG. 7 presents a schematic diagram of an example of an embodiment of a circuit for processing the signal produced by a position sensor according to the invention.

Various circuits are known, and even recommended by Hall probe manufacturers, for amplifying the signal of the Hall probe and ensuring compensation of the temperature coefficient of the probe's sensitivity. As shown in FIG. 7, a voltage-controlled Hall probe 70 is compensated in temperature by a thermistor 71 placed in a counter-reaction circuit of output amplifier 72. The output amplifier 72 may include, in the example described, one of the TAB2453 circuits.

As an example, in an automobile, in addition to operating in a wide temperature range (−40° C. to +103° C., at least under the hood), there is a need to operate at 5 V and provide an output signal that varies from a low value, close to 0 V, to a high value, close to 5 V. So-called "rail to rail" integrated circuits exist which meet this latter requirement. The difficulty arises in ensuring temperature compensation not only of the Hall probe but also of electronic components and the connection. The output wires of Hall probe 9 are directly soldered to printed circuit 25.

Figure 6:
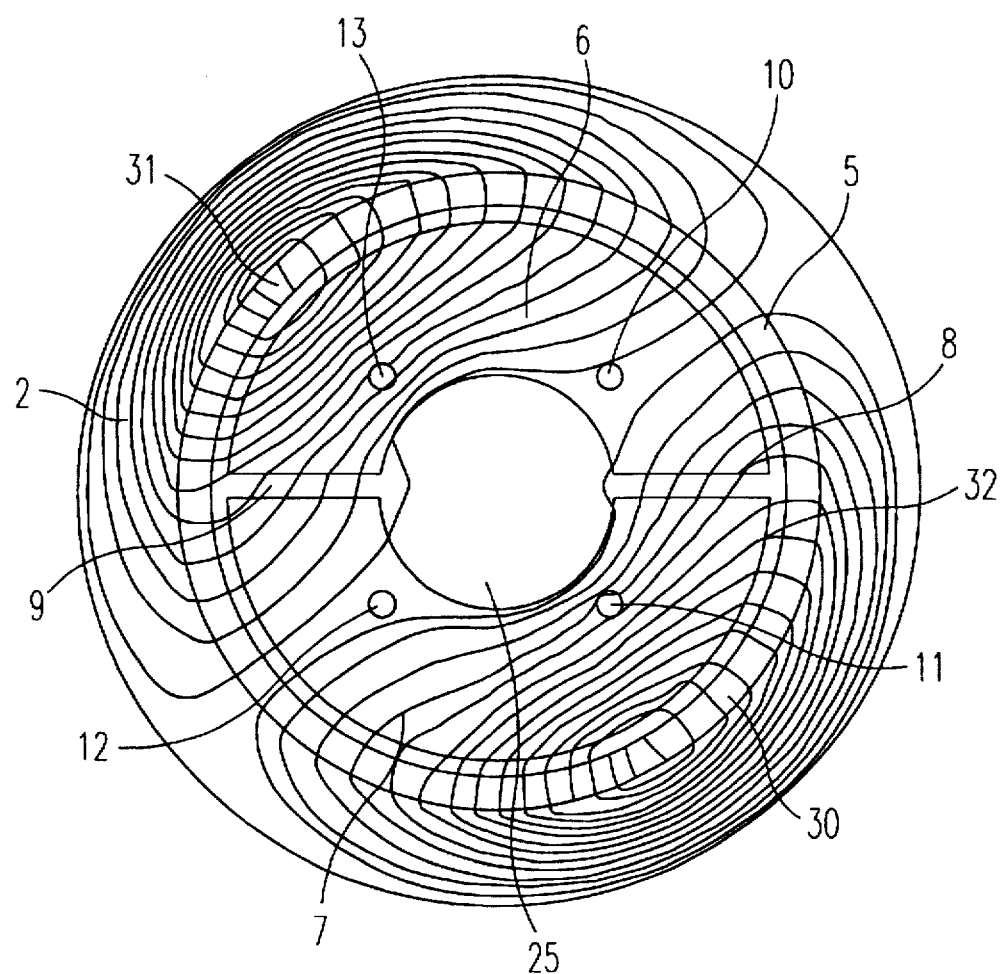
FIG. 6 presents a diagrammatic view of the magnetic flux lines.

FIG. 6 diagrammatically depicts the flux lines produced by permanent magnet 5.

Permanent magnet 5 is preferably a tubular-shaped samarium-cobalt 2-17 magnet having two diametrically opposed magnetic transitions 30, 31. As an example, the outside diameter of the magnet 5 is 22 millimeters, and its radially measured thickness, in the direction of magnetization, is 1.25 millimeters. Magnet 5 moves in a main air gap 32 with a width of 1.75 millimeters. Magnet 5 is fastened to a tubular-shaped yoke 2 having an outside diameter of 28 millimeters and an inside diameter of 22 millimeters. Stator 6, 7, which is generally tubular in shape and has an outside diameter of 18.5 millimeters and an inside diameter of 8 millimeters, includes two identical parts in the shape of a cylinder with a semicircular section, which within itself forms a secondary air gap 8 with a width of 0.8 millimeter.

In the position indicated in FIG. 6, the axis passing through magnetic transitions 30, 31 of the magnet 5 forms an angle of 40 degrees with the axis passing through secondary air gap 8.

The field lines produced by magnet 5 are symmetrical in relation to the axis of rotation. These field lines close up without leakage through outside yoke 2, whose section must be sufficient to allow the entire magnetic field to pass, and without leakage through stator 6, 7. Since the stator 6, 7 is interrupted by an air gap 8, also of the magnet, without adversely affecting the magnitude of the output signal and keeping in the probe the maximum intensity $i_{max}$ permitted by the probe's highest internal resistance $R_{max}$ at the most critical temperature, or $i_{max}$ slightly less than 5/Rmax. Therefore, it is necessary to have, in series with the probe 9, the lowest resistance possible.

Figure 8:
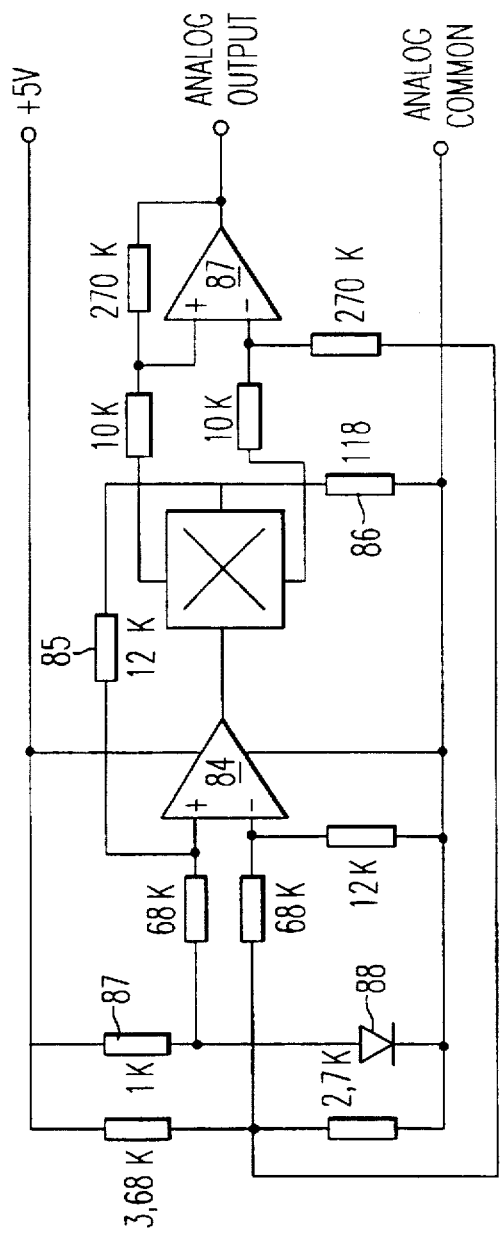
FIG. 8 presents the schematic diagram of an example of embodiment of an electronic circuit for processing the signal delivered by the sensor according to the invention.

Since the results obtained with known circuits have not been satisfactory, a more suitable circuit, shown in FIG. 8, has been developed.

Hall probe 80 may be one marketed by SIEMENS under the reference KSY14, which has a coefficient of −0.05% K. The permanent magnet may be one marketed by the SHIN ETSU company under the reference R6 and has a coefficient of −0.04% K. The total temperature coefficient that needs to be compensated in order for the temperature not to cause an error in the angular position measurement is −0.09%/K.

The sensitivity of Hall probe 80 is a linear function of its feed current. The temperature correction uses a silicon diode 88 as a temperature sensor. The temperature coefficient is on the order of −1.65 mV/K. for a forward voltage of 0.6 V at 20° C. This diode 88 is placed at the input of operational amplifier 84 which ensures current control of Hall probe 80 and further serves to modulate the current as a function of temperature to change the sensitivity of Hall probe 80. To compensate for several drifts other than those of Hall probe 80 and the magnet, an attempt is made to compensate an overall coefficient of 0.113%/K.

The voltage at the non-inverting input of first amplifier 84 is fixed by two resistors 85, 86 in series and provides a reference of 2.11 V. Amplifier 84 includes one of the two amplifiers incorporated into the same case of a circuit OP292.

The voltage at the inverting input of amplifier 84 is provided by a resistor 87 in series with the diode 88. This resistance is fixed to obtain 0.6 V at 20° C.

The gain of the operational amplifier is 12000/68000= 0.1765. The voltage at resistor 86 of 118Ω for control of the current is (2.11−0.6) * 0.1765=0.266 V and the current is 0.266/118=0.00225 A. At 130° C. the voltage of diode 88 is 0.6(1−110*0.00165)=0.418 V. The current in Hall probe 80 is then (2.11−0.418)*0.1765/118=0.00253A.

Amplifier 84 then delivers an output voltage of 3.93 V; there is still some margin in relation to the maximum acceptable voltage to take into account the maximum resistance of Hall probe 80 that can be encountered in series production.

The temperature coefficient of the compensation, calculated for the considered variation of 110° C., is (2.53−2.25)/ 2.25/110*100=+0.113%/K., which exactly compensates the coefficient to be corrected. It is clear that the adaptation of the resistors makes it possible to adjust to other values to be compensated.

Second amplifier 87 makes it possible to obtain the range of measurement desired by adjusting the resistance which determines the gain, or 270Ω in FIG. 8.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters patent of the United States is:

1. A magnetic position sensor, comprising:
   a coupling shaft;
   a coaxial tubular yoke coupled to the coupling shaft;
   a tubular-shaped permanent magnet coupled to the coaxial tubular yoke, wherein the permanent magnet is mobile in rotation and is radially magnetized;
   a stator formed on an inside of the permanent magnet, wherein a cylindrical air gap is formed between the stator and the permanent magnet, the stator further including a secondary air gap; and
   a Hall probe formed in the secondary air gap;
   wherein the permanent magnet is formed of first and second parts, and an inside surface of the first part is in contact with an entire outside surface of the second part, and wherein said coaxial tubular yoke is connected to a transverse flange for coupling to the coupling shaft.

2. A magnetic position sensor, comprising:
   a coupling shaft;
   a coaxial tubular yoke coupled to the coupling shaft;
   a tubular-shaped permanent magnet coupled to the coaxial tubular yoke, wherein the permanent magnet is mobile in rotation and is radially magnetized;
   a stator formed on an inside of the permanent magnet, wherein a cylindrical air gap is formed between the stator and the permanent magnet, the stator further including a secondary air gap; and
   a Hall probe formed in the secondary air gap;
   wherein the stator includes two parts made of a soft magnetic material in a shape of a roof tile, having at least two positioning cavities in a stationary molding.

3. A magnetic position sensor according to claim 1, comprising:
   a coupling shaft;
   a coaxial tubular yoke coupled to the coupling shaft;
   a tubular-shaped permanent magnet coupled to the coaxial tubular yoke, wherein the permanent magnet is mobile in rotation and is radially magnetized;
   a stator formed on an inside of the permanent magnet, wherein a cylindrical air gap is formed between the stator and the permanent magnet, the stator further including a secondary air gap; and
   a Hall probe formed in the secondary air gap;
   wherein the stator is molded in a stationary molding case having an axial bore which forms a bearing for the coupling shaft.

4. The magnetic position sensor according to claim 3, wherein the molding case of the stator includes a groove for positioning the permanent magnet and the coaxial tubular yoke is extended by a coaxial outside annular part, with an inside diameter at least equal to an outside diameter of the coaxial tubular yoke, with said permanent magnet being extended by at least one fastening lug.

5. The magnetic position sensor according to claim 4, wherein the molding case has a cavity for housing the Hall probe in the secondary air gap, with the molding case having at a rear front part a housing for an electronic circuit for processing signals generated by the Hall probe.

6. A magnetic position sensor, comprising:
   a coupling shaft;
   a coaxial tubular yoke coupled to the coupling shaft;
   a tubular-shaped permanent magnet coupled to the coaxial tubular yoke, wherein the permanent magnet is mobile in rotation and is radially magnetized;
   a stator formed on an inside of the permanent magnet, wherein a cylindrical air gap is formed between the stator and the permanent magnet, the stator further including a secondary air gap; and
   a Hall probe formed in the secondary air gap;
   wherein a length of the permanent magnet is less than a length of the stator by a value between E and 2E, where E designates a width of the primary air gap.

7. A magnetic position sensor, comprising:
   a coupling shaft;
   a coaxial tubular yoke coupled to the coupling shaft;
   a tubular-shaped permanent magnet coupled to the coaxial tubular yoke, wherein the permanent magnet is mobile in rotation and is radially magnetized;
   a stator formed on an inside of the permanent magnet, wherein a cylindrical air gap is formed between the stator and the permanent magnet, the stator further including a secondary air gap;

a Hall probe formed in the secondary air gap;

an operational amplifier having inverting and non-inverting inputs for receiving an output of the Hall probe;

a diode in series with a first resistor connected to the inverting input of the operational amplifier for temperature correction; and second and third series resistors connected to the non-inverting input of the operational amplifier to provide a reference voltage to the non-inverting input.

8. A magnetic position sensor comprising:

a coupling shaft;

a coaxial tubular yoke coupled to the coupling shaft;

a tubular-shaped permanent magnet coupled to the coaxial tubular yoke, wherein the permanent magnet is mobile in rotation and is radially magnetized;

a stator formed on an inside of the permanent magnet, wherein a cylindrical air gap is formed between the stator and the permanent magnet, the stator further including a secondary air gap dividing the stator into two semi-circular portions; and a Hall probe formed in the secondary air gap.

9. The magnetic position sensor according to claim 8, wherein the permanent magnet is integral with the coaxial tubular yoke.

10. The magnetic position sensor according to claim 8, wherein the permanent magnet is formed of first and second parts, and an inside surface of the first part is in contact with an entire outside surface of the second part, and wherein said coaxial tubular yoke is connected to a transverse flange for coupling to the coupling shaft.

11. The magnetic position sensor according to claim 8, wherein the stator includes two parts made of a soft magnetic material in a shape of a roof tile, having at least two positioning cavities in a stationary molding.

12. The magnetic position sensor according to claim 8, wherein the stator is molded in a stationary molding case having an axial bore which forms a bearing for the coupling shaft.

13. The magnetic position sensor according to claim 12, wherein the molding case of the stator includes a groove for positioning the permanent magnet and the coaxial tubular yoke is extended by a coaxial outside annular part, with an inside diameter at least equal to an outside diameter of the coaxial tubular yoke, with said permanent magnet being extended by at least one fastening lug.

14. The magnetic position sensor according to claim 13, wherein the molding case has a cavity for housing the Hall probe in the secondary air gap, with the molding case having at a rear front part a housing for an electronic circuit for processing signals generated by the Hall probe.

15. The magnetic position sensor according to claim 8, wherein a length of the permanent magnet is less than a length of the stator by a value between E and 2E, where E designates a width of the primary air gap.

16. A magnetic position sensor, comprising:

a coupling shaft;

a coaxial tubular yoke coupled to the coupling shaft;

a tubular-shaped permanent magnet coupled to the coaxial tubular yoke, wherein the permanent magnet is mobile in rotation and is radially magnetized;

a stator formed on an inside of the permanent magnet, wherein a cylindrical air gap is formed between the stator and the permanent magnet, the stator further including a secondary air gap dividing the stator into two semi-circular portions;

a Hall probe formed in the secondary air gap;

an operational amplifier having inverting and non-inverting inputs for receiving an output of the Hall probe;

a diode in series with a first resistor connected to the inverting input of the operational amplifier for temperature correction; and second and third series resistors connected to the non-inverting input of the operational amplifier to provide a reference voltage to the non-inverting input.

\* \* \* \* \*